Sept. 30, 1924.
G. NORDLOH
SUCKER ROD ELEVATOR
Filed June 9, 1924
1,510,413
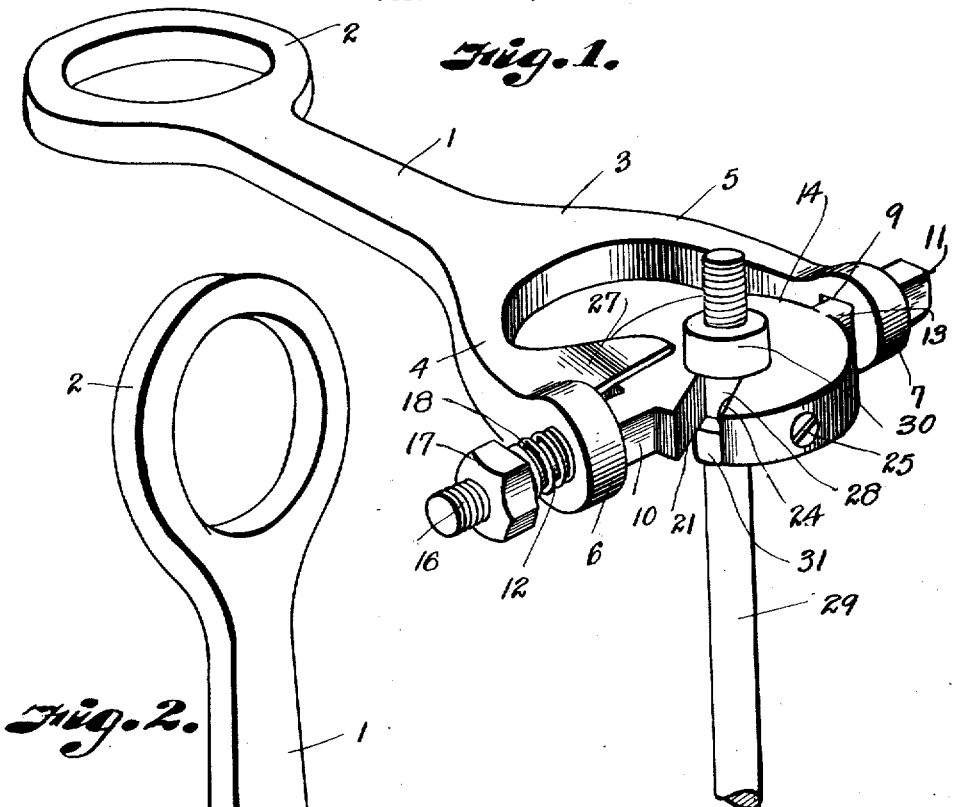
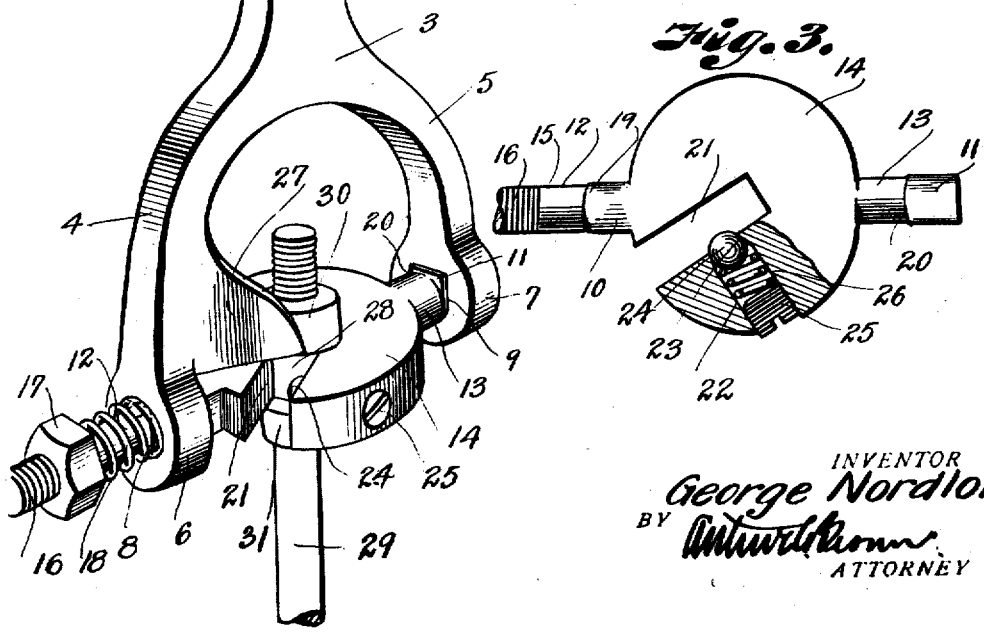
INVENTOR
George Nordloh.
BY
ATTORNEY Patented Sept. 30, 1924.

1,510,413

UNITED STATES PATENT OFFICE.

GEORGE NORDLOH, OF HAMILTON, KANSAS.

SUCKER-ROD ELEVATOR.

Application filed June 9, 1924. Serial No. 718,855.

*To all whom it may concern:*

Be it known that I, GEORGE NORDLOH, a citizen of the United States, residing at Hamilton, in the county of Greenwood and State of Kansas, have invented certain new and useful Improvements in Sucker-Rod Elevators; and I do declare the following to be a full, clear, and exact description of the invention, such as will enable others skilled in the art to which it appertains to make and use the same, reference being had to the accompanying drawings and to the figures of reference marked thereon, which form a part of this specification.

This invention relates to a sucker rod elevator and the primary object is to provide an easily applied effective elevator for pulling the sucker rods of pumps.

Fig. 1 is a perspective view of a sucker rod elevator constructed in accordance with my invention showing the position of the latch yoke for permitting the sucker rod to be applied and detached.

Fig. 2 is a similar view with the latch in functional position, and

Fig. 3 is a plan view of the sucker rod retaining jaw, part being shown in section.

The latch yoke is illustrated as comprising a shank 1 having an eye 2 at one end and an arch shaped portion 3 at the other. The arms 4 and 5 of the arch shaped portion 3 are provided with bearings 6 and 7 having openings 8 and 9 polygonal in cross section to receive the polygonal portions 10 and 11 on the trunnions 12 and 13, diametrically disposed from the jaw 14 which receives the sucker rod. The polygonal portion 10 is adjacent to the edge of the jaw 14. The polygonal portion 11 is on the end of the trunnion 13, consequently it is spaced from the edge of the jaw 14. The trunnion 12 is provided with a rounded portion 15 terminating in a threaded end 16 to receive a nut 17 between which and the bearing 6 is an expansion spring 18 tending to cause the polygonal portions 10 and 11 to seat in the polygonal openings 8 and 9 of the bearings 6 and 7. The polygonal portions 10 and 11 however have their ends curved as at 19 and 20 so that they can be "cammed" out of the bearings or into the bearings when the jaw 14 is turned.

The jaw 14 is provided with an elongated slot 21 which extends from the periphery of the jaw 14 into the center portion of the jaw and at one edge of the slot 21 is a recess 22 having a constricted opening 23 through which a detent ball 24 may extend, the opening 23 having a diameter less than that of the ball. The outer portion of the recess is provided with a threaded plug 25 between which and the ball is an expansion spring 26 to urge the ball to the edge of the slot 21. The arm 4 of the latch yoke is provided with a guard or latching finger 27 which is directed inwardly with respect to the yoke so that when the yoke is perpendicular to the face of the jaw 14 the finger 27 will extend across the slot and close it so that if the squared end 28 of the sucker rod 29 is in the slot, it cannot be removed so long as the latch finger 27 is in the position shown in Fig. 2.

When the parts are in the position shown in Fig. 2, the polygonal portions of the trunnions will engage the polygonal portions of the bearings 6 and 7, therefore the jaw cannot be turned and the rod 29 will be held against longitudinal movement with respect to the jaw by the collars 30 and 31 engaging opposite faces of the jaw 14.

If it is desired to remove the sucker rod the jaw will be shifted laterally against the spring 18 so that the polygonal portions 10 and 11 will move out of the bearing and by virtue of the cammed ends 19 and 20, the yoke may be turned at an angle to the perpendicular as indicated in Fig. 1. The sucker rod may then be moved out of the slot, the ball 24 merely being a friction detent to prevent the sucker rod from passing out of the slot accidentally.

In applying the elevator to the sucker rod, the parts will assume substantially the position shown in Fig. 1 and of course the latching position will be that indicated in Fig. 2.

What I claim and desire to secure by Letters-Patent is:

1. A sucker rod elevator comprising a yoke having an eye at one end, an arched portion at the other, the ends of the arched portion having bearings with openings polygonal in cross section, a jaw having a sucker rod receiving slot, trunnions on the jaw, polygonal portions on the trunnions movable into and out of engagement with the polygonal openings in the bearings, a spring for normally urging the polygonal portions into engagement with the polygonal openings in the bearings and a latch finger carried by one of the arms and extending across the slot in the jaw when the yoke is in one position with respect to the jaw and movable away from the slot when the yoke is in another position with respect to the jaw.

2. A sucker rod elevator comprising a yoke having depending arms provided with bearings having polygonal openings therethrough, a sucker rod receiving jaw, trunnions on the jaw, one of the trunnions having a polygonal portion adjacent to the edge of the jaw and a threaded end, a nut on the threaded end of the trunnion, a spring between the nut and one of the arms of the yoke, a polygonal portion on the outer end of the other trunnion and a guard member carried by one of the arms to normally retain the sucker rod engaged by the jaw.

3. A sucker rod elevator comprising a member having aligning arms provided with aligning bearings, a shiftable sucker rod engaging a jaw, trunnions on the jaw mounted in the bearings, the trunnions and bearings having co-operative parts whereby when the jaw is shifted in one direction, it will be held against turning and when shifted in the other direction, it will be permitted to turn with respect to the first named member, a spring normally urging the jaw in one position to prevent turning thereof and means for retaining the sucker rod engaged by the jaw.

In testimony whereof I affix my signature.

GEORGE NORDLOH.